US012347319B2

(12) United States Patent
Xu et al.

(10) Patent No.: US 12,347,319 B2
(45) Date of Patent: Jul. 1, 2025

(54) PLATOON POSITIONING SYSTEM AND METHOD BASED ON VEHICLE TO VEHICLE COMMUNICATION AND USING RELATIVE POSE INFORMATION BETWEEN VEHICLES IN A PLATOON

(71) Applicant: Beijing Tusen Weilai Technology Co., Ltd., Beijing (CN)

(72) Inventors: Yong Xu, Beijing (CN); Nan Wu, Beijing (CN)

(73) Assignee: BEIJING TUSEN WEILAI TECHNOLOGY CO., LTD., Beijing (CN)

( * ) Notice: Subject to any disclaimer, the term of this patent is extended or adjusted under 35 U.S.C. 154(b) by 134 days.

(21) Appl. No.: 17/334,500

(22) Filed: May 28, 2021

(65) Prior Publication Data

US 2021/0383702 A1 Dec. 9, 2021

(30) Foreign Application Priority Data

Jun. 5, 2020 (CN) .......................... 202010503874.4

(51) Int. Cl.
*G01C 21/30* (2006.01)
*B60W 60/00* (2020.01)
(Continued)

(52) U.S. Cl.
CPC .......... *G08G 1/22* (2013.01); *B60W 60/0025* (2020.02); *G08G 1/096791* (2013.01);
(Continued)

(58) Field of Classification Search
CPC ...... G08G 1/22; G08G 1/096791; G08G 1/20; B60W 60/0025; B60W 2530/203; B60W 2756/10; B60W 2554/80
See application file for complete search history.

(56) References Cited

U.S. PATENT DOCUMENTS

2001/0054524 A1* 12/2001 Masters ............... B62D 13/025
280/426
2010/0049374 A1* 2/2010 Ferrin .................. G05D 1/0295
701/1
(Continued)

FOREIGN PATENT DOCUMENTS

CN          105159291 A      12/2015
CN          105698783 A  *    6/2016 ............. G01C 21/00
(Continued)

OTHER PUBLICATIONS

CN110335305A—Machine Translation (Year: 2019).*
(Continued)

*Primary Examiner* — Jess Whittington
*Assistant Examiner* — Rami Nabih Bedewi
(74) *Attorney, Agent, or Firm* — Perkins Coie LLP (57) ABSTRACT

The present disclosure relates to a method, an apparatus, a medium, and a device for processing vehicle data. According to the embodiments of the present disclosure, a vehicle mounted server on each vehicle in a platoon can determine a position of the vehicle based on position information and parameter value information of one or more specified kinematic parameters transmitted by another vehicle mounted server on a vehicle in front of the vehicle and determined parameter value information of one or more specified relative pose parameters between the vehicle where the vehicle mounted server is located and the vehicle in front of the vehicle where the vehicle mounted server is located. In this way, as the position of the leading can be determined accurately, the position of each following vehicle can also be determined accurately despite presence of a blind area when its forward field of view is blocked.

11 Claims, 3 Drawing Sheets

(51) Int. Cl.
  *G01S 13/931* (2020.01)
  *G05D 1/243* (2024.01)
  *G05D 1/248* (2024.01)
  *G05D 1/695* (2024.01)
  *G08G 1/00* (2006.01)
  *G08G 1/0967* (2006.01)
  *H04L 67/12* (2022.01)
  *H04L 67/52* (2022.01)

(52) U.S. Cl.
  CPC ......... *G08G 1/20* (2013.01); *B60W 2530/203* (2020.02); *B60W 2554/80* (2020.02); *B60W 2756/10* (2020.02)

(56) References Cited

U.S. PATENT DOCUMENTS

| | | | | |
|---|---|---|---|---|
| 2017/0242095 | A1* | 8/2017 | Schuh | G05D 1/0293 |
| 2018/0283048 | A1* | 10/2018 | Hage | G01S 19/16 |
| 2019/0385461 | A1* | 12/2019 | Blomstrand | B60D 1/481 |
| 2020/0057453 | A1* | 2/2020 | Laws | G05D 1/0088 |
| 2020/0241563 | A1* | 7/2020 | Van Der Knaap | B60W 30/12 |
| 2020/0324763 | A1* | 10/2020 | Switkes | G08G 1/161 |
| 2021/0148724 | A1* | 5/2021 | Bang | G01C 21/3691 |
| 2021/0199463 | A1* | 7/2021 | Kitahara | B60W 60/001 |
| 2022/0126864 | A1* | 4/2022 | Moustafa | B60W 50/00 |
| 2022/0180749 | A1* | 6/2022 | Narushima | G08G 1/052 |

FOREIGN PATENT DOCUMENTS

| | | | |
|---|---|---|---|
| CN | 107728175 A | | 2/2018 |
| CN | 108646737 A | | 10/2018 |
| CN | 110335305 A | * | 10/2019 |

OTHER PUBLICATIONS

CN105698783A—Machine Translation (Year: 2016).*
Chinese Patent Office, Second Office Action for CN 202010503874.4, Mailing Date: Oct. 21, 2022, 18 pages with English translation.
Chinese Application No. 202010503874.4 Office Action Mailed Apr. 29, 2022, pp. 1-11.

* cited by examiner

PLATOON POSITIONING SYSTEM AND METHOD BASED ON VEHICLE TO VEHICLE COMMUNICATION AND USING RELATIVE POSE INFORMATION BETWEEN VEHICLES IN A PLATOON

CROSS-REFERENCE TO RELATED APPLICATIONS

The present disclosure claims priority to and the benefits of Chinese Patent Application No. 202010503874.4, titled "METHOD, APPARATUS, MEDIUM AND DEVICE FOR PROCESSING VEHICLE DATA", filed Jun. 5, 2020, the content of which is incorporated herein by reference in its entirety.

TECHNICAL FIELD

The present disclosure relates to Internet of Vehicles technology, and more particularly, to a method, an apparatus, a medium, and a device for processing vehicle data.

BACKGROUND

Vehicles based on autonomous driving technology can typically form a platoon and move one after another. A vehicle at the front of the platoon can be referred to as a leading vehicle, and the other vehicles can be referred to as following vehicles. When the following vehicles are following the leading vehicle, position information of each vehicle in the platoon needs to be obtained. The position information of a vehicle can be obtained by using a positioning sensor and an on-vehicle map. The position information of the vehicle can be obtained by using the positioning sensor and the on-vehicle map as follows. Information on the surrounding environment of the vehicle can be collected by using the positioning sensor mounted on the vehicle, such as at least one of a camera, a laser radar, a millimeter wave radar, etc. The collected information on the surrounding environment of the vehicle can be matched with the pre-loaded on-vehicle map to obtain the position information of the vehicle based on the matching result.

Figure 1:
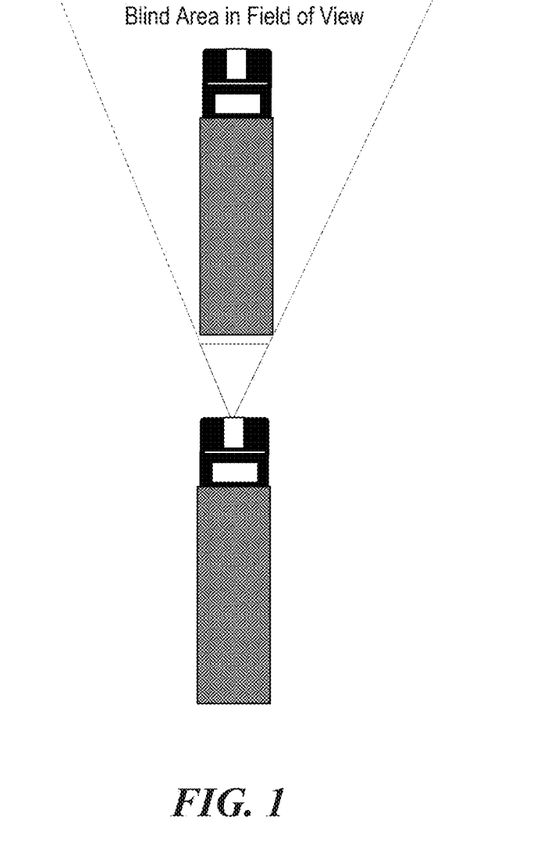
FIG. 1 is a schematic diagram showing a blind area in a field of view of a following vehicle in the related art.

However, the distance between the vehicles in the platoon is relatively small, typically smaller than 10 meters. Only the positioning sensor mounted on the leading vehicle in the platoon can have a sufficient forward field of view and thus can collect enough information on the surrounding environment to achieve accurate positioning of the leading vehicle. However, the positioning sensor mounted on each following vehicle in the platoon will have its forward field of view be blocked by the vehicle in front of it, and thus have a blind area in its forward field of view, which prevents it from collecting enough information on the surrounding environment to achieve accurate positioning of the following vehicle. The forward field of view required by the positioning sensor mounted on the following vehicle can be understood as a large triangular area formed by the solid lines and the dotted lines as shown in FIG. 1, and the blind area in the forward field of view of the following vehicle can be understood as the area other than the small triangle area formed by the solid lines in the forward field of view in FIG. 1.

In this case, in order to achieve accurate positioning of the following vehicle, the distance between the vehicles in the platoon can be increased, for example, to 100 meters, to ensure that the positioning sensor mounted on the following vehicle can also obtain a sufficient forward field of view and thus can collect enough information on the surrounding environment to achieve accurate positioning of the following vehicle. However, the solution of increasing the distance between the vehicles in the platoon makes it easier for other vehicles to cut in, which creates a safety risk for the platoon.

SUMMARY

The embodiments of the present disclosure provide a method, an apparatus, a medium, and a device for processing vehicle data, capable of solving the problem of inaccurate positioning of a following vehicle due to a blind area in a field of view when position information of the vehicle is obtained by using a positioning sensor and an on-vehicle map.

The present disclosure provides a method for processing vehicle data. The method is applied in a platoon including a plurality of vehicles. The platoon includes a leading vehicle and one or more following vehicles following the leading vehicle. The method includes: receiving, by a first vehicle mounted server, position information and parameter value information of one or more specified kinematic parameters transmitted by a second vehicle mounted server on a vehicle in front of a vehicle where the first vehicle mounted server is located; and determining, by the first vehicle mounted server, first position information corresponding to the vehicle where the first vehicle mounted server is located based on determined parameter value information of one or more specified relative pose parameters between the vehicle where the first vehicle mounted server is located and the vehicle in front of the vehicle where the first vehicle mounted server is located and the received position information and the received parameter value information of the one or more specified kinematic parameters.

The present disclosure further provides an apparatus for processing vehicle data. The apparatus is applied in a platoon including a plurality of vehicles. The platoon includes a leading vehicle and one or more following vehicles following the leading vehicle. The apparatus includes: a receiving module configured to receive position information and parameter value information of one or more specified kinematic parameters transmitted by a second vehicle mounted server on a vehicle in front of a vehicle where a first vehicle mounted server is located; and a positioning module configured to determine first position information corresponding to the vehicle where the first vehicle mounted server is located based on determined parameter value information of one or more specified relative pose parameters between the vehicle where the first vehicle mounted server is located and the vehicle in front of the vehicle where the first vehicle mounted server is located and the received position information and the received parameter value information of the one or more specified kinematic parameters.

The present disclosure further provides a non-volatile computer storage medium. The non-volatile computer storage medium stores an executable program which, when executed by a processor, implements the above method.

The present disclosure further provides a device for processing vehicle data. The device includes a processor, a communication interface, a memory, and a communication bus. The processor, the communication interface, and the memory communicate with each other via the communication bus. The memory is configured to store a computer program. The processor is configured to implement, when executing the program stored on the memory, the steps in the above method.

According to the embodiments of the present disclosure, a vehicle mounted server on each vehicle in a platoon can determine a position of the vehicle based on position information and parameter value information of one or more specified kinematic parameters transmitted by another vehicle mounted server on a vehicle in front of the vehicle where the vehicle mounted server is located and determined parameter value information of one or more specified relative pose parameters between the vehicle where the vehicle mounted server is located and the vehicle in front of the vehicle where the vehicle mounted server is located. In this way, as the position of the leading can be determined accurately, the position of each following vehicle can also be determined accurately despite presence of a blind area when its forward field of view is blocked.

Additional features and advantages of the present disclosure will be set forth in the following description, or become apparent at least in part from the following description, or can be learned from practicing of the present disclosure. The objects and other advantages of the present disclosure can be achieved and obtained from structures specifically described in the description, claims, and drawings.

BRIEF DESCRIPTION OF THE DRAWINGS

In order to describe the technical solutions according to the embodiments of the present disclosure or the prior art more clearly, figures used in description of the embodiments or the prior art will be introduced briefly below. Obviously, the figures described below only illustrate some embodiments of the present disclosure, and other figures can be obtained by those of ordinary skill in the art based on these drawings without any inventive efforts.

DETAILED DESCRIPTION OF THE EMBODIMENTS

In the following, the solutions according to the embodiments of the present disclosure will be described clearly and completely with reference to the figures. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

In order to solve the problem associated with positioning of a following vehicle in a platoon, the present disclosure proposes to transmit position information of a leading vehicle, determined based on information on a surrounding environment collected by a positioning sensor on the leading vehicle, and kinematic information of the leading vehicle to the first following vehicle through vehicle-to-vehicle communication devices. The first following vehicle can then accurately determine its own position based on the information from the leading vehicle and obtained relative pose information (the relative pose information can be understood as relative position information and/or relative posture information) between the first following vehicle and a vehicle in front of the first following vehicle, so as to overcome the problem of inaccurate positioning of the first following vehicle due to a blind area in its field of view. After the first following vehicle determines its own position, it can further transmit its own position information and its own kinematic information to the second following vehicle, such that the second following vehicle can also determine its own position, and so on. In this way, each following vehicle in the platoon can determine its own position accurately.

It is to be noted that position information of a vehicle can be typically obtained by using a satellite positioning system, such as a Global Positioning System (GPS), mounted on the vehicle.

The solutions according to the present disclosure are particularly usable in cases where the satellite positioning system cannot be used to obtain the position information of the vehicle, due to failure of the satellite positioning system, e.g., in a tunnel where satellite signals are blocked. In such cases, with the solutions according to the present disclosure, positioning sensors and on-vehicle maps can be used to achieve accurate positioning of each vehicle in the platoon.

Of course, the solution provided in the present disclosure is also applicable when the satellite positioning system can function normally. The solutions according to the present disclosure are applicable when positioning sensors and on-vehicle maps can be used for vehicle positioning.

In addition, it is to be noted that, due to presence of a blind area in a field of view, a following vehicle in a platoon cannot accurately determine its own position, and cannot accurately obtain information on surrounding obstacles.

In the solutions according to the present disclosure, obstacle coordinate information corresponding to the leading vehicle determined based on the information on the surrounding environment collected by the positioning sensor on the leading vehicle can also be transmitted to the first following vehicle. The first following vehicle can convert the received obstacle coordinate information to its own vehicle coordinate system to obtain accurate information on surrounding obstacles corresponding to itself, so as to overcome the problem that the accurate information on surrounding obstacles cannot be obtained due to the blind area in its field of view. After the first following vehicle obtains the information on surrounding obstacles, it can further transmit the determined obstacle coordinates to the second following vehicle, such that the second following vehicle can also obtain accurate information on surrounding obstacles corresponding to itself, and so on. In this way, each following vehicle in the platoon can obtain the accurate information on surrounding obstacles.

In the following, the present disclosure will be described in further detail with reference to the figures, such that the objects, solutions, and advantages of the present disclosure will become more apparent. Obviously, the embodiments described below are only some, rather than all, of the embodiments of the present disclosure. Starting from the embodiments of the present disclosure, those skilled in the art can obtain other embodiments without applying any inventive skills and all these embodiments are to be encompassed by the scope of the present disclosure.

It is to be noted that the phrase "a plurality of" or "a number of" as used herein means two or more. The term "and/or" as used herein only represents a relationship between correlated objects, including three possibilities. For example, "A and/or B" means A only, B only, or both A and B. In addition, the symbol "/" as used herein represents an "or" relationship between the correlated objects preceding and succeeding the symbol.

It is to be noted that the terms "first" and "second" in the description and claims of the present disclosure and the above-mentioned figures are used to distinguish similar objects from each other, and are not necessarily used to describe a specific sequence or order. It should be understood that the data used in this way can be interchanged as appropriate such that the embodiments of the present disclosure can be implemented in orders other than those shown or described herein.

In addition, the terms "comprising" and "having" and any variants thereof are intended to cover non-exclusive inclusions. For example, a process, method, system, product or device that includes a series of steps or units is not necessarily limited to those steps or units that are explicitly listed, and may include other steps or units that are not explicitly listed or are inherent to the process, method, product, or device.

Embodiment 1

Figure 2:
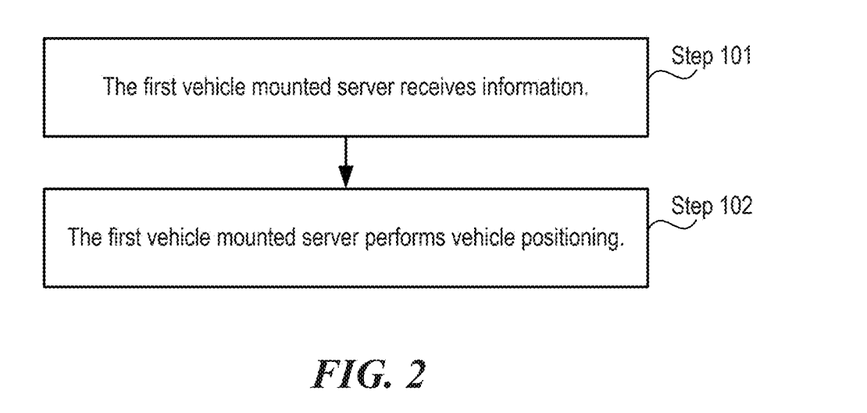
FIG. 2 is a flowchart illustrating a method for processing vehicle data according to Embodiment 1 of the present disclosure.

Embodiment 1 of the present disclosure provides a method for processing vehicle data, which is applied to a platoon including a plurality of vehicles. The platoon includes a leading vehicle and one or more following vehicles following the leading vehicle. In particular, the method can be applied in a vehicle mounted server (in this embodiment, it can be referred to as a first vehicle mounted server) on a following vehicle. The process flow of the method is shown in FIG. 2, including the following steps.

At step 101, the first vehicle mounted server receives information.

In this step, the first vehicle mounted server may receive position information and parameter value information of one or more specified kinematic parameters transmitted by a second vehicle mounted server on a vehicle in front of a vehicle where the first vehicle mounted server is located.

It is to be noted that, when the vehicle where the second vehicle mounted server is located is the leading vehicle in the platoon, the position information transmitted by the second vehicle mounted server may be position information corresponding to the vehicle where the second vehicle mounted server is located as obtained by the second vehicle mounted server by matching information on a surrounding environment of the vehicle where the second vehicle mounted server is located, collected by a positioning sensor on the vehicle where the second vehicle mounted server is located, with a pre-loaded on-vehicle map.

When the vehicle where the second vehicle mounted server is located is one of the one or more following vehicles in the platoon, the position information transmitted by the second vehicle mounted server may be position information corresponding to the vehicle where the second vehicle mounted server is located as determined by the second vehicle mounted server based on determined parameter value information of one or more specified relative pose parameters between the vehicle where the second vehicle mounted server is located and a vehicle in front of the vehicle where the second vehicle mounted server is located and position information and parameter value information of one or more specified kinematic parameters transmitted by a third vehicle mounted server on the vehicle in front of the vehicle where the second vehicle mounted server is located and received by the second vehicle mounted server.

At step 102, the first vehicle mounted server performs vehicle positioning.

In this step, the first vehicle mounted server may determine position information corresponding to the vehicle where the first vehicle mounted server is located based on determined parameter value information of one or more specified relative pose parameters between the vehicle where the first vehicle mounted server is located and the vehicle in front of the vehicle where the first vehicle mounted server is located and the received position information and the received parameter value information of the one or more specified kinematic parameters.

It is to be noted that, in this embodiment, the position information determined by the first vehicle mounted server in the step 102 may be used as the position information of the vehicle where the first vehicle mounted server is located.

In a possible implementation, the first vehicle mounted server may further fuse the determined first position information corresponding to the vehicle where the first vehicle mounted server is located and at least one piece of obtained position information corresponding to the vehicle where the first vehicle mounted server is located (the position information may be obtained using any method, for example, by means of GPS positioning, or by the first vehicle mounted server by matching information on a surrounding environment collected by a positioning sensor mounted on the vehicle where it is located with a pre-loaded on-vehicle map), to obtain position information corresponding to the vehicle where the first vehicle mounted server is located, thereby further improving the accuracy of vehicle positioning.

That is, in this embodiment, the first vehicle mounted server may fuse the determined position information (referred to as first position information) corresponding to the vehicle where it is located, and the at least one piece of obtained position information (referred to as second position information) corresponding to the vehicle where it is located, to obtain the position information (referred to as fused position information) corresponding to the vehicle where it is located.

In a possible implementation, in addition to the vehicle positioning based on the information on the surrounding environment collected by the leading vehicle, each following vehicle in the platoon may further identify surrounding obstacles based on the information on the surrounding environment collected by the leading vehicle to further overcome the problem that accurate information on surrounding obstacles cannot be obtained due to presence of a blind area in its field of view.

That is, in this embodiment, the first vehicle mounted server may further receive obstacle coordinate information transmitted by the second vehicle mounted server on the vehicle in front of the vehicle where the first vehicle mounted server is located; and determine obstacle coordinate information corresponding to the vehicle where the first vehicle mounted server is located based on the determined parameter value information of the one or more specified relative pose parameters between the vehicle where the first vehicle mounted server is located and the vehicle in front of the vehicle where the first vehicle mounted server is located and the received parameter value information of the one or more specified kinematic parameters and the received obstacle coordinate information.

It is to be noted that, when the vehicle where the second vehicle mounted server is located is the leading vehicle in the platoon, the obstacle coordinate information transmitted by the second vehicle mounted server may be obstacle coordinate information corresponding to the vehicle where the second vehicle mounted server is located as obtained by the second vehicle mounted server by matching information on a surrounding environment of the vehicle where the second vehicle mounted server is located, collected by a positioning sensor on the vehicle where the second vehicle mounted server is located, with a pre-loaded on-vehicle map (the obstacle coordinate information can be understood as relative position information between the obstacle(s) and the vehicle where the second vehicle mounted server is located).

When the vehicle where the second vehicle mounted server is located is one of the one or more following vehicles in the platoon, the obstacle coordinate information transmitted by the second vehicle mounted server may be obstacle coordinate information corresponding to the vehicle where the second vehicle mounted server is located as determined by the second vehicle mounted server based on determined parameter value information of one or more specified relative pose parameters between the vehicle where the second vehicle mounted server is located and a vehicle in front of the vehicle where the second vehicle mounted server is located and obstacle coordinate information and parameter value information of one or more specified kinematic parameters transmitted by a third vehicle mounted server on the vehicle in front of the vehicle where the second vehicle mounted server is located and received by the second vehicle mounted server (the obstacle coordinate information can be understood as relative position information between the obstacle(s) and the vehicle where the second vehicle mounted server is located).

In this embodiment, the positioning sensor may be any positioning sensor, including, for example, at least one of a camera, a laser radar, a millimeter wave radar, and the like.

In an example where the positioning sensor is a camera, the collected information on the surrounding environment of the vehicle may be in a form of video data or image data. The operation of matching the information on the surrounding environment of the vehicle as collected by the positioning sensor on the vehicle with the pre-loaded on-vehicle map to obtain the position information or obstacle coordinate information can be understood as obtaining the position information or obstacle coordinate information based on pixel coordinates.

In an example where the positioning sensor is a laser radar or millimeter wave radar, the collected information on the surrounding environment of the vehicle may be in a form of point cloud data. The operation of matching the information on the surrounding environment of the vehicle as collected by the positioning sensor on the vehicle with the pre-loaded on-vehicle map to obtain the position information or obstacle coordinate information can be understood as obtaining the position information or obstacle coordinate information based on point cloud coordinates.

In addition, it is to be noted that, in an example where each vehicle in the platoon is a truck including a tractor and a trailer, in a possible implementation, in this embodiment, the one or more specified kinematic parameters may include a heading angle, an angle between the tractor and the trailer, a distance from a point where a GPS is mounted to a rotation shaft of the trailer, and a distance from the rotation shaft of the trailer to a rear of the trailer.

The one or more specified relative pose parameters between each vehicle and the vehicle in front of that vehicle may include an angle between the tractor of that vehicle and a trailer of the vehicle in front of that vehicle, and a distance from the point where the GPS is mounted on that vehicle to a rear of the trailer of the vehicle in front of that vehicle.

Figure 3:
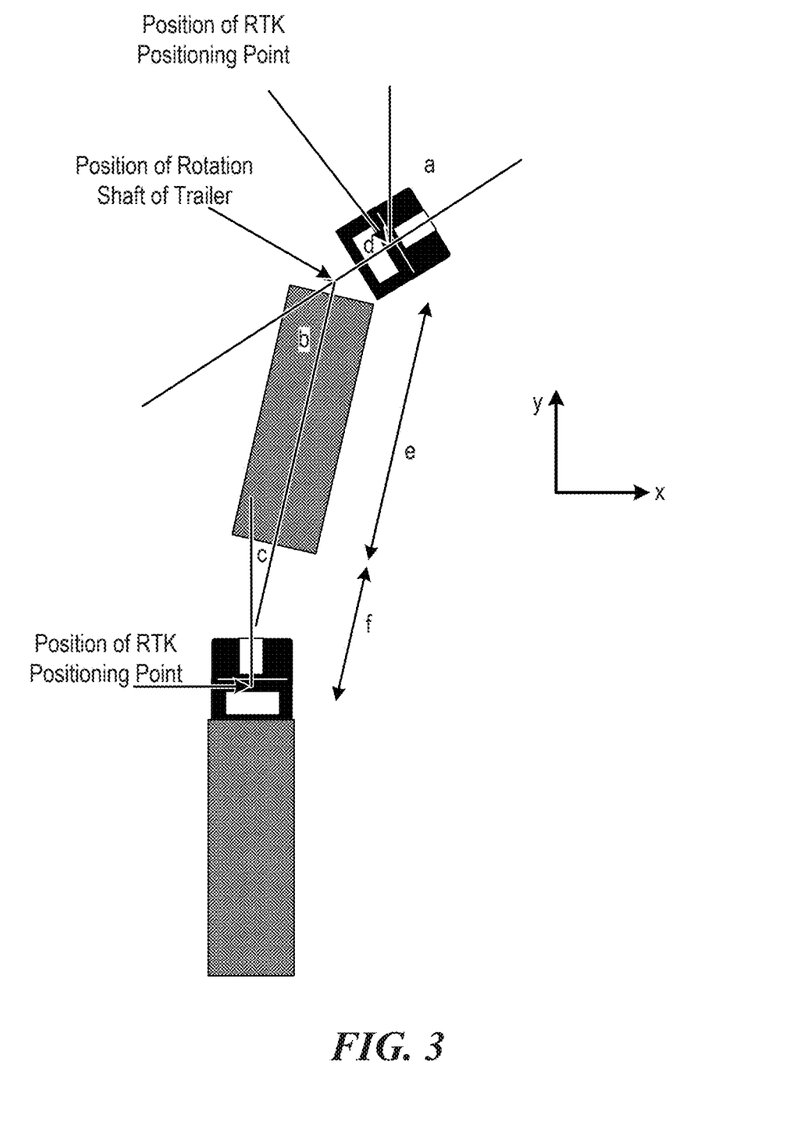
FIG. 3 is a schematic diagram showing a first kinematic parameter and a second kinematic parameter according to Embodiment 1 of the present disclosure.

Assuming that the parameter value of the heading angle is denoted as a, the parameter value of the angle between the tractor and the trailer is denoted as b, and the parameter value of the distance from the point where the GPS is mounted (which can be referred to as RTK positioning point for short) to the rotation shaft of the trailer is denoted as d, the parameter value of the distance from the rotation shaft of the trailer to the rear of the trailer is denoted as e, the parameter value of the angle between the tractor of that vehicle and the trailer of the vehicle in front of that vehicle is denoted as c, and the parameter value of the distance from the point where the GPS is mounted on that vehicle to the rear of the trailer of the vehicle in front of that vehicle is denoted as f, a schematic diagram of the kinematic parameters and the relative pose parameters can be shown in FIG. 3.

The first vehicle mounted server may determine the position information corresponding to the vehicle where it is located from the position information of the vehicle in front of the vehicle where it is located, based on the obtained parameter values of the kinematic parameters and the relative pose parameters.

For example, assuming that the parameter values of the specified kinematic parameters received by the first vehicle mounted server are a, b, d, and e, respectively, as shown in FIG. 3, the determined parameter values of the specified relative pose parameters are c and f, respectively, as shown in FIG. 3, for example, if the position information of the vehicle in front of the vehicle where the first vehicle mounted server is located as received by the first vehicle mounted server is denoted as (x0, y0), then the position information (X, Y) corresponding to the vehicle where the first vehicle mounted server is located as determined by the first vehicle mounted server can be expressed as follows:

$$X = x0 - d*\sin(a) - (e+f)*\sin(a-b),$$

$$Y = y0 - d*\cos(a) - (e+f)*\cos(a-b).$$

Further, it is to be noted that the first vehicle mounted server can also determine the obstacle coordinate information corresponding to the vehicle where it is located from the obstacle coordinate information corresponding to the vehicle in front of the vehicle where it is located, based on the obtained parameter values of the kinematic parameters and relative pose parameters.

Continuing with the above example, the first vehicle mounted server can determine the parameter value of the heading angle of the vehicle where it is located. Assuming that the parameter value of the heading angle of the vehicle where the first vehicle mounted server is located is denoted as k, then k=a−b−c.

Then the relative turning angle between the vehicle where the first vehicle mounted server is located and the vehicle in front of the vehicle where the first vehicle mounted server is located is k−a=−b−c.

The position translation amount between the vehicle where the first vehicle mounted server is located and the vehicle in front of the vehicle where the first vehicle mounted server is located can be expressed as:

$$X - x0 = -d*\sin(a) - (e+f)*\sin(a-b),$$

$$Y - y0 = -d*\cos(a) - (e+f)*\cos(a-b).$$

According to the relative turning angle between the vehicle where the first vehicle mounted server is located and the vehicle in front of the vehicle where the first vehicle mounted server is located, and the position translation amount between the vehicle where the first vehicle mounted server is located and the vehicle in front of the vehicle where the first vehicle mounted server is located, a rotation matrix M between the vehicle where the first vehicle mounted server is located and the vehicle in front of the vehicle where the first vehicle mounted server is located can be constructed as:

$$M = \begin{matrix} \cos(k-a) & -\sin(k-a) & (X-x0) \\ \sin(k-a) & \cos(k-a) & (Y-y0) \\ 0 & 0 & 1 \end{matrix}$$

The rotation matrix M is inversed to obtain M'.

Assuming that the obstacle coordinates corresponding to the vehicle in front of the vehicle where the first vehicle mounted server is located are denoted as P0, then the obstacle coordinates P' corresponding to the vehicle where the first vehicle mounted server is located can be expressed as:

$$P'=M'*P0.$$

It is to be noted that, after converting the received obstacle coordinates to the coordinate system of the vehicle where the first vehicle mounted server is located, the first vehicle mounted server can determine various obstacle information based on the converted obstacle coordinates, including e.g., at least one of a position and size of the obstacle and a moving speed and direction of the obstacle.

The solution according to Embodiment 1 of the present disclosure will be further explained below with reference to a specific embodiment.

Embodiment 2

It is assumed that there are three vehicles in a platoon, denoted as Vehicle 1, Vehicle 2, and Vehicle 3, respectively. Here, Vehicle 1 is a leading vehicle, Vehicle 2 is the first following vehicle (that is, the first vehicle behind Vehicle 1), and Vehicle 3 is the second following vehicle (that is, the second vehicle behind Vehicle 1). It is also assumed that the platoon is moving in a tunnel, the platoon is in an autonomous driving state, and none of the vehicles in the platoon can receive GPS signals. That is, none of the three vehicles can determine its position by means of GPS positioning.

In this case, a vehicle mounted server on Vehicle 1 can match information on a surrounding environment of the vehicle as collected by a positioning sensor (e.g., laser radar and camera) on Vehicle 1 with a pre-loaded on-vehicle map to obtain position information and obstacle coordinate information corresponding to Vehicle 1.

The vehicle mounted server on vehicle 1 can broadcast/transmit the position information, obstacle coordinate information, and parameter value information of specified kinematic parameters of Vehicle 1 (the vehicle mounted server can determine parameter values of the specified kinematic parameters in any appropriate scheme) at the frequency of 20 Hz, and a vehicle mounted server on Vehicle 2 and a vehicle mounted server on Vehicle 3 can both receive the broadcast, but the vehicle mounted server on Vehicle 3 does not process it.

The vehicle mounted server on Vehicle 2 can determine parameter value information of specified relative pose parameters between Vehicle 2 and Vehicle 1 by using a positioning sensor (e.g., laser radar and camera) on Vehicle 2 (of course, the vehicle mounted server can determine parameter values of the specified relative pose parameters in any appropriate scheme), and determine position information and obstacle coordinate information corresponding to Vehicle 2 based on the determined parameter value information and the received broadcast. Of course, in this embodiment, the vehicle mounted server on Vehicle 2 can further use the determined position information corresponding to Vehicle 2 as a data source for position information fusion. For example, the determined position information corresponding to Vehicle 2 can be data fused with position information obtained by matching information on a surrounding environment collected by the positioning sensor mounted on Vehicle 2 with a pre-loaded on-vehicle map, so as to finally obtain the position information corresponding to Vehicle 2.

The vehicle mounted server on Vehicle 2 can also broadcast/transmit the position information, obstacle coordinate information, and parameter value information of the specified kinematic parameters corresponding to Vehicle 2. The vehicle mounted server on Vehicle 1 and the vehicle mounted server on Vehicle 3 can both receive the broadcast, but the vehicle mounted server on Vehicle 1 does not process it.

The vehicle mounted server on Vehicle 3 can determine parameter value information of specified relative pose parameters between Vehicle 3 and Vehicle 2 by using a positioning sensor (e.g., laser radar and camera) on Vehicle 3, and determine position information and obstacle coordinate information corresponding to Vehicle 3 based on the determined parameter value information and the received broadcast. Of course, in this embodiment, the vehicle mounted server on Vehicle 3 can further use the determined position information corresponding to Vehicle 3 as a data source for position information fusion. For example, the determined position information corresponding to Vehicle 3 can be data fused with position information obtained by matching information on a surrounding environment collected by the positioning sensor mounted on Vehicle 3 with a pre-loaded on-vehicle map, so as to finally obtain the position information corresponding to Vehicle 3.

In the solutions according to Embodiment 1 and Embodiment 2 of the present disclosure, a solution for sharing a field of view is provided to solve the problem that due to presence of a blind area in a field of view, a following vehicle in a platoon cannot perceive the blind area in the field of view. The following vehicle in the platoon can perceive the blind area in its field of view based on perception of a forward field of view by a leading vehicle, so as to achieve accurate vehicle positioning and obstacle identification.

In addition, it is to be noted that the solutions according to Embodiment 1 and Embodiment 2 of the present disclosure can effectively solve the problem of vehicle positioning when GPS positioning fails in a tunnel.

Correspondingly to the method according to Embodiment 1, the following apparatus is provided.

Embodiment 3

Figure 4:
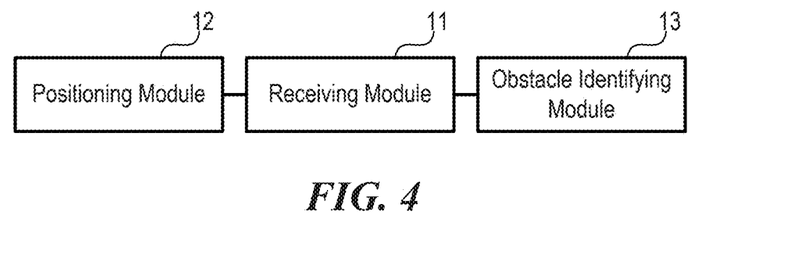
FIG. 4 is a schematic diagram showing a structure of an apparatus for processing vehicle data according to Embodiment 3 of the present disclosure.

Embodiment 3 of the present disclosure provides an apparatus for processing vehicle data, which is applied to a platoon including a plurality of vehicles. The platoon includes a leading vehicle and one or more following vehicles following the leading vehicle. The apparatus may have a structure shown in FIG. 4, including:

a receiving module 11 configured to receive position information and parameter value information of one or more specified kinematic parameters transmitted by a second vehicle mounted server on a vehicle in front of a vehicle where a first vehicle mounted server is located; and a positioning module 12 configured to determine first position information corresponding to the vehicle where the first vehicle mounted server is located based on determined parameter value information of one or more specified relative pose parameters between the vehicle where the first vehicle mounted server is located and the vehicle in front of the vehicle where the first vehicle mounted server is located and the received position information and the received parameter value information of the one or more specified kinematic parameters.

Here, when the vehicle where the second vehicle mounted server is located is the leading vehicle in the platoon, the position information transmitted by the second vehicle mounted server may be position information corresponding to the vehicle where the second vehicle mounted server is located as obtained by the second vehicle mounted server by matching information on a surrounding environment of the vehicle where the second vehicle mounted server is located, collected by a positioning sensor on the vehicle where the second vehicle mounted server is located, with a pre-loaded on-vehicle map.

When the vehicle where the second vehicle mounted server is located is one of the one or more following vehicles in the platoon, the position information transmitted by the second vehicle mounted server may be position information corresponding to the vehicle where the second vehicle mounted server is located as determined by the second vehicle mounted server based on determined parameter value information of one or more specified relative pose parameters between the vehicle where the second vehicle mounted server is located and a vehicle in front of the vehicle where the second vehicle mounted server is located and position information and parameter value information of one or more specified kinematic parameters transmitted by a third vehicle mounted server on the vehicle in front of the vehicle where the second vehicle mounted server is located and received by the second vehicle mounted server.

In a possible implementation, the positioning module 12 may be further configured to fuse the determined first position information corresponding to the vehicle where the first vehicle mounted server is located and at least one piece of obtained second position information corresponding to the vehicle where the first vehicle mounted server is located to obtain fused position information corresponding to the vehicle where the first vehicle mounted server is located.

In a possible implementation, each of the plurality of vehicles may be a truck including a tractor and a trailer. The one or more specified kinematic parameters may include a heading angle, an angle between the tractor and the trailer, a distance from a point where a GPS is mounted to a rotation shaft of the trailer, and a distance from the rotation shaft of the trailer to a rear of the trailer. The one or more specified relative pose parameters between each vehicle and the vehicle in front of that vehicle may include an angle between the tractor of that vehicle and a trailer of the vehicle in front of that vehicle, and a distance from the point where the GPS is mounted on the vehicle to a rear of the trailer of the vehicle in front of that vehicle.

In a possible implementation, the apparatus may further include an obstacle identifying module 13.

The receiving module 11 may be further configured to receive obstacle coordinate information transmitted by the second vehicle mounted server on the vehicle in front of the vehicle where the first vehicle mounted server is located.

The obstacle identifying module 13 may be configured to determine obstacle coordinate information corresponding to the vehicle where the first vehicle mounted server is located based on the parameter value information of the one or more specified relative pose parameters between the vehicle where the first vehicle mounted server is located and the vehicle in front of the vehicle where the first vehicle mounted server is located and the received parameter value information of the one or more specified kinematic parameters and the received obstacle coordinate information.

Here, when the vehicle where the second vehicle mounted server is located is the leading vehicle in the platoon, the obstacle coordinate information transmitted by the second vehicle mounted server may be obstacle coordinate information corresponding to the vehicle where the second vehicle mounted server is located as obtained by the second vehicle mounted server by matching information on a surrounding environment of the vehicle where the second vehicle mounted server is located, collected by a positioning sensor on the vehicle where the second vehicle mounted server is located, with a pre-loaded on-vehicle map.

When the vehicle where the second vehicle mounted server is located is one of the one or more following vehicles in the platoon, the obstacle coordinate information transmitted by the second vehicle mounted server may be obstacle coordinate information corresponding to the vehicle where the second vehicle mounted server is located as determined by the second vehicle mounted server based on determined parameter value information of one or more specified relative pose parameters between the vehicle where the second vehicle mounted server is located and a vehicle in front of the vehicle where the second vehicle mounted server is located and obstacle coordinate information and parameter value information of one or more specified kinematic parameters transmitted by a third vehicle mounted server on the vehicle in front of the vehicle where the second vehicle mounted server is located and received by the second vehicle mounted server.

In a possible implementation, the positioning module 12 may be configured to determine the first position information (X, Y) corresponding to the vehicle where the first vehicle mounted server is located according to:

$$X = x0 - d^*\sin(a) - (e+f)^*\sin(a-b),$$

$$Y = y0 - d^*\cos(a) - (e+f)^*\cos(a-b),$$

where (x0, y0) denotes the position information transmitted by the second vehicle mounted server on the vehicle in front of the vehicle where the first vehicle mounted server is located and received by the first vehicle mounted server, a denotes the parameter value of the heading angle as transmitted by the second vehicle mounted server on the vehicle in front of the vehicle where the first vehicle mounted server is located and received by the first vehicle mounted server, b denotes the parameter value of the angle between the tractor and the trailer as transmitted by the second vehicle mounted server on the vehicle in front of the vehicle where the first vehicle mounted server is located and received by the first vehicle mounted server, d denotes the parameter value of the distance from the point where the GPS is mounted to the rotation shaft of the trailer as transmitted by the second vehicle mounted server on the vehicle in front of the vehicle where the first vehicle mounted server is located and received by the first vehicle mounted server, e denotes the parameter value of the distance from the rotation shaft of the trailer to the rear of the trailer as transmitted by the second vehicle mounted server on the vehicle in front of the vehicle where the first vehicle mounted server is located and received by the first vehicle mounted server, and f denotes the parameter value of the distance from the point where the GPS is mounted on the vehicle where the first vehicle mounted server is located to the rear of the trailer of the vehicle in front of the vehicle where the first vehicle mounted server is located as determined by the first vehicle mounted server.

In a possible implementation, the obstacle identifying module 13 may be configured to determine the obstacle coordinate information P′ corresponding to the vehicle where the first vehicle mounted server is located according to:

$$P'=M'*P0,$$

where P0 denotes the obstacle coordinate information transmitted by the second vehicle mounted server on the vehicle in front of the vehicle where the first vehicle mounted server is located and received by the first vehicle mounted server;

M′ denotes an inverse matrix of a rotation matrix M between the vehicle where the first vehicle mounted server is located and the vehicle in front of the vehicle where the first vehicle mounted server is located, where $$M = \begin{matrix} \cos(k-a) & -\sin(k-a) & (X-x0) \\ \sin(k-a) & \cos(k-a) & (Y-y0) \\ 0 & 0 & 1 \end{matrix}$$

where k denotes the parameter value of the heading angle of the vehicle where the first vehicle mounted server is located, and k=a−b−c, where c denotes the parameter value of the angle between the tractor of the vehicle where the first vehicle mounted server is located and the trailer of the vehicle in front of the vehicle where the first vehicle mounted server is located as determined by the first vehicle mounted server.

Based on the same inventive concept, the embodiments of the present disclosure provide the following device and medium.

Embodiment 4

Figure 5:
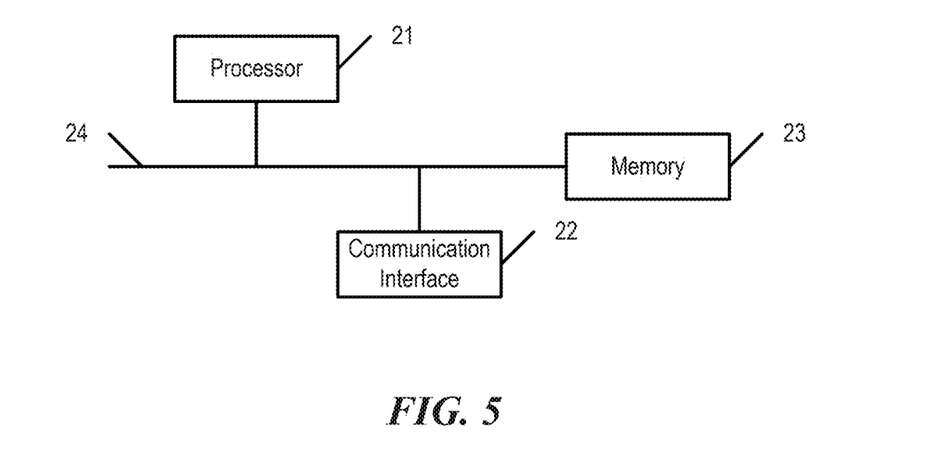
FIG. 5 is a schematic diagram showing a structure of a device for processing vehicle data according to Embodiment 4 of the present disclosure.

Embodiment 4 of the present disclosure provides a device for processing vehicle data. The device may have a structure as shown in FIG. 5, including a processor 21, a communication interface 22, a memory 23, and a communication bus 24. The processor 21, the communication interface 22, and the memory 23 communicate with each other via the communication bus 24.

The memory 23 is configured to store a computer program.

The processor 21 is configured to implement, when executing the program stored on the memory, the method according to Embodiment 1 of the present disclosure.

Optionally, the processor 21 may specifically include a Central Processing Unit (CPU), an Application Specific Integrated Circuit (ASIC), one or more integrated circuits for controlling program execution, a hardware circuit developed by Field Programmable Gate Array (FPGA), or a baseband processor.

Optionally, the processor 21 may include at least one processing core.

Optionally, the memory 23 may include a Read-Only Memory (ROM), a Random Access Memory (RAM), and a disk memory. The memory 23 is configured to store data required by the at least one processor 21 during operation. The number of memories 33 may be one or more.

Embodiment 5 of the present disclosure provides a non-volatile computer storage medium storing an executable program which, when executed by a processor, implements the method according to Embodiment 1 of the present disclosure.

In a specific implementation process, the computer storage medium may include: a Universal Serial Bus (USB) Flash Drive, a mobile hard disk, a Read-Only Memory (ROM), a Random Access Memory (RAM), a magnetic disk, an optical disc, or other storage medium capable of storing program codes.

In the embodiments of the present disclosure, it can be appreciated that the disclosed devices and methods may be implemented in other ways. For example, the device embodiments described above are illustrative only. For example, the units or divisions thereof are only divisions based on logical functions. There may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical or in any other forms.

The functional units in the embodiments of the present disclosure may be integrated into one processing unit, or alternatively be separate physical modules.

When the integrated unit is implemented in the form of a software functional unit and sold or used as a standalone product, it can be stored in a computer readable storage medium. Based on this understanding, all or part of the technical solutions according to the embodiments of the present disclosure can be embodied in the form of a software product. The computer software product may be stored in a storage medium and contain instructions to enable a computer device, such as a personal computer, a server, or a network device, etc., or a processor to perform all or part of the steps of the method described in each of the embodiments of the present disclosure. The storage medium may include a Universal Serial Bus Flash Drive, a mobile hard disk, a ROM, a RAM, a magnetic disk, an optical disc, or any other medium capable of storing program codes.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage, CD-ROM, and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the preferred embodiments of the present disclosure have described above, further alternatives and modifications can be made to these embodiments by those skilled in the art in light of the basic inventive concept of the present disclosure. The claims as attached are intended to cover the preferred embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method for processing data, applied in a platoon comprising a leading vehicle and one or more following vehicles following the leading vehicle, the method comprising:
  receiving, by a first vehicle mounted server located on a first vehicle, second position information and parameter value information of one or more specified kinematic parameters transmitted by a second vehicle mounted server located on a second vehicle in front of the first vehicle, wherein each of the first vehicle and the second vehicle comprises a tractor and a trailer, and the one or more specified kinematic parameters comprise a heading angle of the second vehicle, an angle between the tractor of the second vehicle and the trailer of the second vehicle, a distance from a point of the second vehicle where a second Global Positioning System (GPS) is mounted to a rotation shaft of the trailer of the second vehicle, and a distance from the rotation shaft of the trailer of the second vehicle to a rear of the trailer of the second vehicle;
  collecting, by a positioning sensor on the first vehicle, information on surrounding environment of the first vehicle;
  determining, by the first vehicle mounted server based on the information on the surrounding environment of the first vehicle, a distance from a point where a first GPS is mounted on the first vehicle to the rear of the trailer of the second vehicle;
  calculating, by the first vehicle mounted server using at least the parameter value information of the one or more specified kinematic parameters transmitted by the second vehicle mounted server located on the second vehicle in front of the first vehicle, coordinates of a first position of the point where the first GPS is mounted on the first vehicle, by:
    determining, by the first vehicle mounted server, the coordinates of the first position of the point where the first GPS is mounted on the first vehicle, based on the heading angle of the second vehicle in front of the first vehicle, the angle between the tractor of the second vehicle and the trailer of the second vehicle in front of the first vehicle, the distance from the point of the second vehicle in front of the first vehicle where the second GPS is mounted to the rotation shaft of the trailer of the second vehicle in front of the first vehicle, and the distance from the rotation shaft of the trailer of the second vehicle in front of the first vehicle to the rear of the trailer of the second vehicle in front of the first vehicle; and
  fusing, by the first vehicle mounted server, the coordinates of the first position of the point where the first GPS is mounted on the first vehicle and a third position information measured by the first GPS, to obtain fused position information corresponding to the first vehicle,
  wherein determining, by the first vehicle mounted server, the coordinates of the first position of the point where the first GPS is mounted on the first vehicle is further based on the distance from the point where the first GPS is mounted on the first vehicle to the rear of the trailer of the second vehicle and the second position information,
  wherein the second vehicle is the leading vehicle, wherein the one or more following vehicles following the leading vehicle comprises the first vehicle, and wherein the second position information is determined by the second vehicle through matching information on a surrounding environment of the second vehicle, collected by a positioning sensor on the second vehicle, with a pre-loaded on-vehicle map.

2. The method of claim 1, further comprising:
receiving, by the first vehicle mounted server, second obstacle coordinate information transmitted by the second vehicle mounted server; and
determining, by the first vehicle mounted server, first obstacle coordinate information corresponding to the first vehicle based on 1) parameter value information of one or more specified relative pose parameters between the first vehicle and the second vehicle, 2) the received parameter value information of the one or more specified kinematic parameters and 3) the second obstacle coordinate information, wherein the one or more specified relative pose parameters between the first vehicle and the second vehicle comprises the distance from the point where the first GPS is mounted on the first vehicle to the rear of the trailer of the second vehicle.

3. The method of claim 2, wherein
the second obstacle coordinate information is obtained by matching information on the surrounding environment of the second vehicle, collected by the positioning sensor on the second vehicle, with the pre-loaded on-vehicle map.

4. The method of claim 3, wherein said determining, by the first vehicle mounted server, the first position represented by coordinates and corresponding to the first vehicle comprises:
determining, by the first vehicle mounted server, the first position according to a set of formulas:

$$X = x0 - d*\sin(a) - (e+f)*\sin(a-b),$$

$$Y = y0 - d*\cos(a) - (e+f)*\cos(a-b),$$

where (x0, y0) denotes the second position information,
wherein a denotes a parameter value of the heading angle of the second vehicle,
wherein b denotes a parameter value of the angle between the tractor of the second vehicle and the trailer of the second vehicle,
wherein d denotes a parameter value of the distance from the point of the second vehicle where the second GPS is mounted to the rotation shaft of the trailer of the second vehicle,
wherein e denotes a parameter value of the distance from the rotation shaft of the trailer of the second vehicle to the rear of the trailer of the second vehicle, and
wherein f denotes a parameter value of the distance from the point where the first GPS is mounted on the first vehicle to the rear of the trailer of the second vehicle.

5. The method of claim 4, wherein said determining, by the first vehicle mounted server, the first obstacle coordinate information comprises:
determining, by the first vehicle mounted server, an obstacle coordinate information P' corresponding to the first vehicle according to:

$$P' = M'*P0,$$

where P0 denotes the second obstacle coordinate information;
M' denotes an inverse matrix of a rotation matrix M between the first vehicle and the second vehicle, where $$M = \begin{matrix} \cos(k-a) & -\sin(k-a) & (X-x0) \\ \sin(k-a) & \cos(k-a) & (Y-y0) \\ 0 & 0 & 1 \end{matrix}$$

where k denotes a parameter value of a heading angle of the first vehicle, and k=a−b−c, where c denotes a parameter value of an angle between the tractor of the first vehicle and the trailer of the second vehicle.

6. A system comprising:
a positioning sensor that collects information on surrounding environment of a first vehicle; and
a device for processing data in a first vehicle mounted server, comprising:
a memory configured to store a computer program, and
a processor coupled to the memory and configured to implement, when executing the computer program stored on the memory, a method comprising:
receiving second position information and parameter value information of one or more specified kinematic parameters transmitted by a second vehicle mounted server located on a second vehicle in front of the first vehicle where the first vehicle mounted server is located, wherein each of the first vehicle and the second vehicle comprises a tractor and a trailer, and the one or more specified kinematic parameters comprise a heading angle of the second vehicle, an angle between the tractor of the second vehicle and the trailer of the second vehicle, a distance from a point of the second vehicle where a second Global Positioning System (GPS) is mounted to a rotation shaft of the trailer of the second vehicle, and a distance from the rotation shaft of the trailer of the second vehicle to a rear of the trailer of the second vehicle;
determining a distance from a point where a first GPS is mounted on the first vehicle to the rear of the trailer of the second vehicle based on the information on the surrounding environment of the first vehicle;
calculating, using at least the parameter value information of the one or more specified kinematic parameters transmitted by the second vehicle mounted server located on the second vehicle in front of the first vehicle, coordinates of a first position of the point where the first GPS is mounted on the first vehicle, by:
determining the coordinates of the first position of the point where the first GPS is mounted on the first vehicle based on the heading angle of the second vehicle in front of the first vehicle, the angle between the tractor of the second vehicle in front of the first vehicle and the trailer of the second vehicle in front of the first vehicle, the distance from the point of the second vehicle in front of the first vehicle where the second GPS is mounted to the rotation shaft of the trailer of the second vehicle in front of the first vehicle, and the distance from the rotation shaft of the trailer of the second vehicle in front of the first vehicle to the rear of the trailer of the second vehicle in front of the first vehicle; and
fusing the coordinates of the first position of the point where the first GPS is mounted on the first vehicle and a third position information measured by the first GPS, to obtain fused position information corresponding to the first vehicle,
wherein determining the coordinates of the first position of the point where the first GPS is mounted on the first vehicle is further based on the distance from the point where the first GPS is mounted on the first vehicle to the rear of the trailer of the second vehicle and the second position information,
wherein the second vehicle is a leading vehicle, wherein the first vehicle is a following vehicle following the leading vehicle, and wherein the second position information is determined by the second vehicle through matching information on a surrounding environment of the second vehicle, collected by a positioning sensor on the second vehicle, with a pre-loaded on-vehicle map.

7. The device of claim 6, wherein the processor is configured to implement the method further comprising:

fusing the first position and at least one piece of obtained third position information corresponding to the first vehicle to obtain fused position information corresponding to the first vehicle.

8. The device of claim 6, wherein the processor is configured to implement the method further comprising:
receiving second obstacle coordinate information transmitted by the second vehicle mounted server; and
determining first obstacle coordinate information corresponding to the first vehicle based on parameter value information of one or more specified relative pose parameters between the first vehicle and the second vehicle and the received parameter value information of the one or more specified kinematic parameters and the second obstacle coordinate information, wherein the one or more specified relative pose parameters between the first vehicle and the second vehicle comprises the distance from the point where the first GPS is mounted on the first vehicle to the rear of the trailer of the second vehicle.

9. The device of claim 8, wherein
the second obstacle coordinate information is obtained by matching information on the surrounding environment of the second vehicle, collected by the positioning sensor on the second vehicle, with the pre-loaded on-vehicle map.

10. The device of claim 9, wherein said determining the first position comprises:
determining the first position according to a set of formulas:

$$X=x0-d*\sin(a)-(e+f)*\sin(a-b),$$

$$Y=y0-d*\cos(a)-(e+f)*\cos(a-b),$$

where (x0, y0) denotes the second position information, wherein a denotes a parameter value of the heading angle of the second vehicle, wherein b denotes a parameter value of the angle between the tractor of the second vehicle and the trailer of the second vehicle, wherein d denotes a parameter value of the distance from the point of the second vehicle where the second GPS is mounted to the rotation shaft of the trailer of the second vehicle, wherein e denotes a parameter value of the distance from the rotation shaft of the trailer of the second vehicle to the rear of the trailer of the second vehicle, and wherein f denotes a parameter value of the distance from the point where the first GPS is mounted on the first vehicle to the rear of the trailer of the second vehicle.

11. The device of claim 10, wherein said determining the first obstacle coordinate information comprises:
determining a first obstacle coordinate information P' corresponding to the first vehicle according to:

$$P'=M'*P0,$$

where P0 denotes the second obstacle coordinate information;
M' denotes an inverse matrix of a rotation matrix M between the first vehicle and the second vehicle,
where $$M = \begin{matrix} \cos(k-a) & -\sin(k-a) & (X-x0) \\ \sin(k-a) & \cos(k-a) & (Y-y0) \\ 0 & 0 & 1 \end{matrix}$$

where k denotes a parameter value of a heading angle of the first vehicle, and k=a-b-c, where c denotes a parameter value of an angle between the tractor of the first vehicle and the trailer of the second vehicle.

\* \* \* \* \*